United States Patent [19]
Ruig

[11] 3,972,679
[45] Aug. 3, 1976

[54] METHOD FOR STERILIZING AND PASTEURIZING CONTAINER PACKED PRODUCTS

[75] Inventor: Kees Ruig, Amstelveen, Netherlands

[73] Assignee: Stork Amsterdam B.V., Amstelveen, Netherlands

[22] Filed: Oct. 31, 1974

[21] Appl. No.: 519,699

[30] Foreign Application Priority Data
Nov. 12, 1973 Netherlands.................. 7315470

[52] U.S. Cl.................................. 21/56; 21/2; 21/80; 21/94; 21/99; 99/362; 426/412; 426/521; 426/522
[51] Int. Cl.² ................. A61L 1/00; A61L 3/00; B65B 55/00
[58] Field of Search ............. 21/80, 56, 94, 99, 2; 99/362; 426/412, 521, 522

[56] References Cited
UNITED STATES PATENTS

| | | | |
|---|---|---|---|
| 3,093,449 | 6/1963 | Kotarski et al. | 21/56 X |
| 3,286,619 | 11/1966 | Lee | 21/80 X |
| 3,340,791 | 9/1967 | Mencacci et al. | 99/362 |
| 3,481,688 | 12/1969 | Craig et al. | 21/56 |
| 3,481,691 | 12/1969 | Trainham | 21/56 X |
| 3,494,722 | 2/1970 | Gray | 21/94 X |
| 3,619,126 | 11/1971 | Carvallo | 21/80 X |

FOREIGN PATENTS OR APPLICATIONS

| | | | |
|---|---|---|---|
| 1,278,910 | 11/1961 | France | 21/80 |
| 983,316 | 2/1965 | United Kingdom | 21/80 |

*Primary Examiner*—Barry S. Richman
*Attorney, Agent, or Firm*—Haseltine, Lake & Waters

[57] ABSTRACT

A method for the thermal sterilization or pasteurization of products packed in pouches which are carried in open perforated baskets suspended in a conveyor traversing a treatment space in which a steam/air mixture under overpressure is maintained, a series of nozzles being provided in the chamber for directing hot water into the baskets at such a rate and in such a fashion as to maintain said pouches in a substantially freely floating condition within said baskets along substantially the entire length of the conveyance path.

2 Claims, 2 Drawing Figures

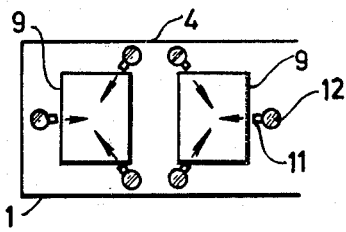
FIG: 3A.
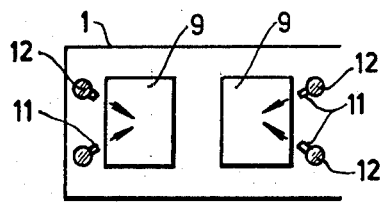
FIG: 3B.
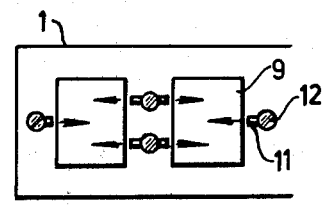
FIG: 3C.
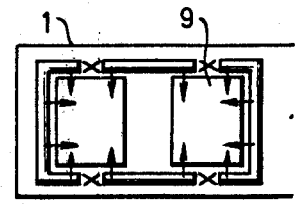
FIG: 3D.
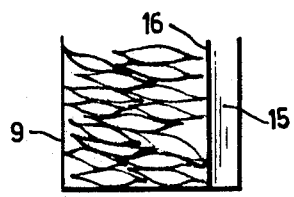
FIG: 3E.
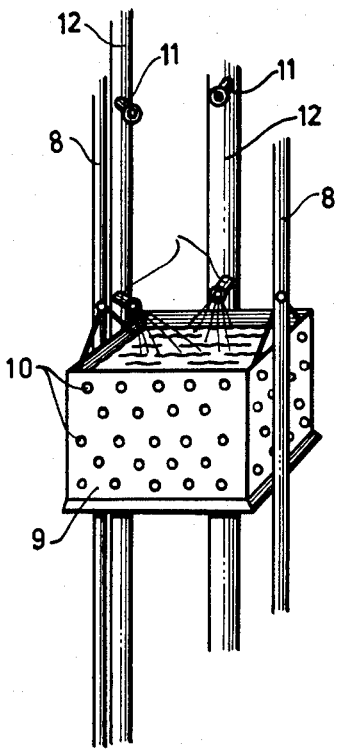
FIG: 2.

METHOD FOR STERILIZING AND PASTEURIZING CONTAINER PACKED PRODUCTS

BACKGROUND OF THE INVENTION

My invention relates to a method for sterilizing or pasteurizing container-packed products such as plastic bags (pouches) while using a conveyor with box-shaped carriers, jointly covering a path in a space, provided with nozzles for supplying a liquid heated to the desired temperature. Such a method is known, for bottles, from the French Pat. No. 619,254. This publication relates to a so-called beer pasteurizer in which the product to be treated needs only be exposed to a temperature below 100°, so that a treatment space can be used which freely communicates with the ambient atmosphere.

DISCUSSION OF THE PRIOR ART

Though in the method known from said French Patent, measures are taken for intensifying the heat transfer by using nozzles for spraying a liquid heated to the desired temperature, this liquid will, however, on dripping down along the carriers soon suffer from a fall in temperature, so that in the lower region of the apparatus a rather poor heat transfer will occur. This means that for a final pasteurization or sterilization a longer stay in the treatment space will be necessary.

It should be noted that from the British Pat. No. 983,316 a method is known for sterilizing or pasteurizing products packed in containers, while a closed treatment space is utilized with a certain overpressure. This overpressure allows a temperature of over 100° and constitutes an additional counter pressure, in order to prevent undesired bulging of containers consisting of slack material. In this known method, however, no box-shaped carriers but cylindrical carriers are used whereby only a limited type of container can be treated viz. a glass container or can which can be slid into the cylinders in a row (a so-called "stick") for following the treatment path. This known method is therefore improper for treating containers consisting of plastic pouches or bags.

SUMMARY OF THE INVENTION

My invention aims to combine the advantages of the two aforementioned methods while avoiding the disadvantages and simultaneously improving the heat transfer.

My invention aims in one aspect to allow a thermal treatment at a temperature which is over 100°C, while according to another aspect, the invention aims to provide a method which allows to treat the contents of plastic pouches which are only difficultly accessible to the heating medium when a plurality of pouches or bags is in a carrier. These objects are attained according to my invention by the combination of an overpressure in the treatment space and a continuous washing of the containers with liquid which is fed to the carriers through the nozzles in a quantity of liquid flowing from each carrier.

Due to these features such a change of the liquid quantity continuously available in each carrier, is obtained that the pouches bearing on each other (but floating slightly owing to the liquid) are efficiently washed, so that products and containers which can only be treated difficultly can be efficiently sterilized or pasteurized.

By adding slightly more liquid than that which flows off from the carriers, there is a continuous immersion of the containers to be sterilized. As an additional advantage of this constant immersion, reference is made to the apparent loss in weight of contents of the containers, so that a lesser load is applied to the wall of the containers. This is particularly of importance at higher temperatures in containers of a synthetic material.

My invention further relates to an apparatus for performing the aforementioned method, comprising a housing provided with an endless conveyor with perforated box-shaped carriers for the containers to be treated, the conveyor following a closed path which extends at least partially within the housing, nozzles for liquid being arranged within the housing, as is known from the aforementioned British Pat. Specification No. 983,316.

In order to adapt this apparatus to the method according to the invention, means are provided for introducing at least into the upper part of the housing compressed gas, while the downwardly directed nozzles are at least arranged along the greater part of the conveyor path. Due to these features operations can be performed at a certain overpressure in order to prevent the containers from undesired bulging, while it is furthermore ensured that independent of the position of the carriers within the housing, a nozzle will always introduce a water jet at the desired temperature into each carrier for permanently replacing the heating liquid available in the carrier.

SURVEY OF THE DRAWINGS

FIG. 2 is, on a larger scale, a perspective view of an individual carrier and some spraying members;

FIG. 3A to 3D are modifications of a possible arrangement according to a horizontal section on line III—III in FIG. 1;

FIG. 3E is a modification for a carrier.

DESCRIPTION OF A PREFERRED EMBODIMENT

Figure 1:
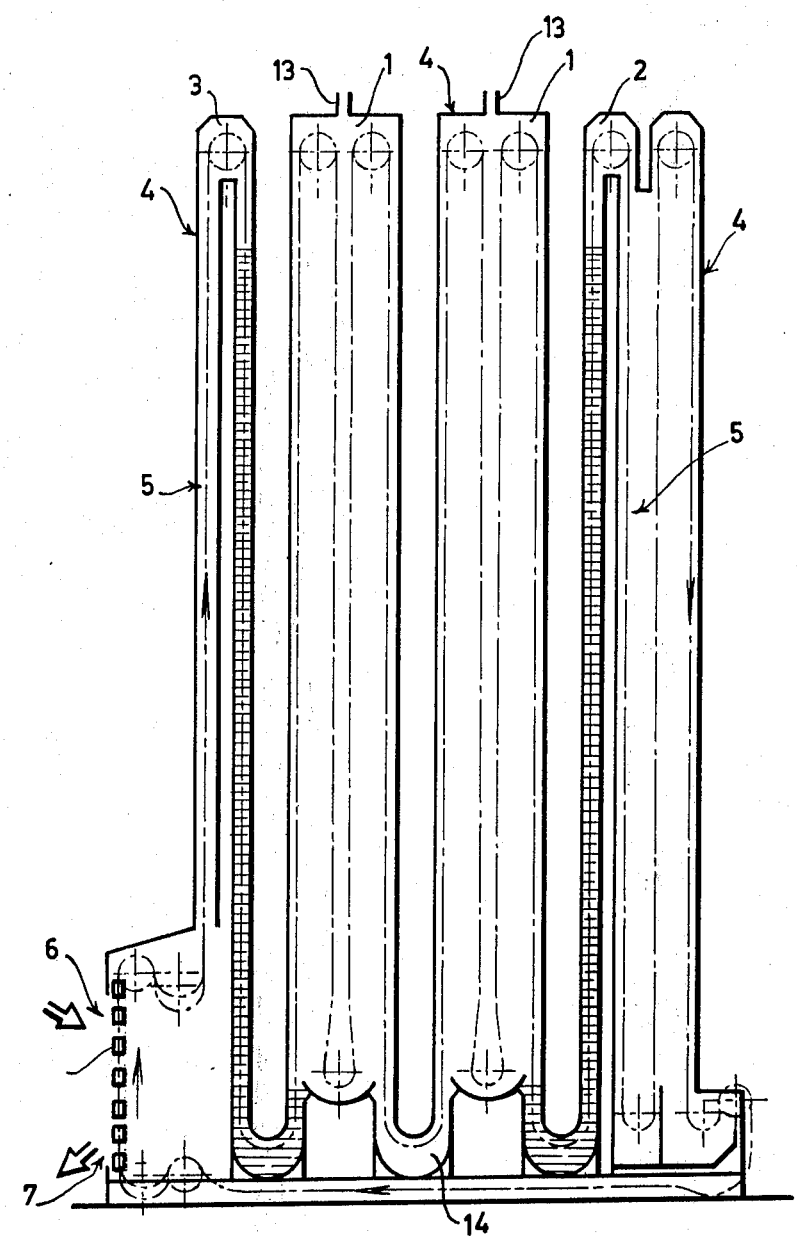
FIG. 1 is a vertical section through a schematically represented apparatus.

As is shown in FIG. 1 the apparatus consists of a treatment space 1, a feed column 2 and a discharge column 3, surrounded by parts of a housing 4. Within this housing an endless conveyor 5 is travelling along a looped path in the space. A loading- and a discharge station 6, 7 (schematically represented) are arranged in the left-hand part of the housing 4. The construction of this apparatus essential sofar in this connection, does not differ fundamentally from the apparatuses, as for example described in the British Pat. No. 983,316, the U.S. Pat. Nos. 3,181,689, 3,163,284, 3,211,275, 3,315,787 and 3,379,115.

The conveyor 5 consists in the described embodiment of two chains 8 (see FIG. 2) between which equidistantly spaced carriers 9 are disposed. These box-shaped carriers serve to accomodate articles like container-packed products and particularly plastic pouches containing milk or any other, eventually pharmaceutical, liquid. Each carrier 9 has a rectangular shape and is provided both in side walls and bottom with perforations 10. Nozzles 11 (see FIG. 2 and 3) are disposed within the treatment space 1 for spraying liquid. These nozzles are connected to conduits 12. The housing 4 is further provided with means 13 via which a compressed gas e.g. air can be introduced into the upper part of the housing.

The nozzles 11 are downwardly directed in order to introduce the liquid jet into the passing carriers 9. The space between two adjacent nozzles 11 is about equal to the smallest dimension of the carriers 9, so that liquid is almost continuously supplied to these carriers on following the path through space 1. The liquid is regularly distributed on the surface of the carriers via the conduits 12 and the nozzles 11. This liquid which for a great part is coming from a receptacle 14 at the lower end of the apparatus, is heated to the desired sterilizing or pasteurizing temperature and passed via a pump (not shown) to the various conduits 12.

In FIGS. 3A to 3D various modifications are shown for the arrangement of the conduits 12 and the nozzles 11. FIG. 3E shows that it is also possible to feed the liquid to an individual compartment 15 of the carrier 9, whereupon this liquid flows, via apertures in the intermediate wall 16, to the containers in the carrier 9.

The arrangement of nozzles 11 along the entire path of the conveyor 5 aims to replace continuously the liquid in the carriers 9, which liquid is, at the temperature desired, to achieve thereby as fast as possible the sterilization or pasteurization of the products in the containers. The liquid jets issuing from the nozzles 11 are tuned in such a manner to the perforations 10 of the carriers 9, that a situation of equilibrium arises in which the carriers 9 remain filled with liquid which is continuously replaced. This is an important improvement with respect to the system according to the aforementioned British Pat. No. 983,316., since in that system the liquid from the upper end of the treatment space will drip down along the carriers which is attendant with a gradual fall in temperature. The required intensity of the heat transfer which is especially desired when pouches of synthetic material are used, is considerably promoted by the system according to my invention.

What I claim is:

1. A process for sterilizing products packed in sealed flexible pouches comprising serially conveying a plurality of open-topped perforated receptacles, each of which contains a plurality of said pouches, through a sterilization chamber, said pouches being substantially unrestrained within said receptacles, directing streams of a heated liquid into said receptacles at a rate such that said pouches remain immersed in said liquid within said receptacles while said liquid is continuously replaced and maintaining an overpressure relative to the pressure created by the vapor of said heated liquid by introduction of a gas into said chamber, said streams of heated liquid being directed into said receptacles from nozzles positioned along substantially the entire conveyance path through said chamber, whereby said pouches attain a substantially freely floating condition thereby permitting all of the external surfaces of each said pouch to be contacted by the heated liquid.

2. A process according to claim 1, including the positioning of said nozzles within said chamber at predetermined spaced locations, and regulating the rate at which said receptacles are conveyed through said chamber in relationship with the interspacing of the receptacles and with the flow of liquid through said nozzles and through said perforations such that said receptacles are maintained substantially filled with heated liquid in which said pouches are immersed.

* * * * *